Oct. 29, 1957  W. B. WESTCOTT, JR., ET AL  2,811,136
LOCK MECHANISM FOR FLUID MOTORS
Filed Oct. 27, 1955  3 Sheets-Sheet 1

INVENTORS
WILLIAM B. WESTCOTT, Jr.
BY WILLIAM A. GAIL

ATTORNEY

INVENTORS
WILLIAM B. WESTCOTT, Jr.
BY WILLIAM A. GAIL

ATTORNEY

INVENTORS
WILLIAM B. WESTCOTT, Jr.
BY WILLIAM A. GAIL

ATTORNEY

United States Patent Office 2,811,136
Patented Oct. 29, 1957

2,811,136

LOCK MECHANISM FOR FLUID MOTORS

William B. Westcott, Jr., Cleveland Heights, and William A. Gail, Maple Heights, Ohio, assignors to The Cleveland Pneumatic Tool Company, Cleveland, Ohio, a corporation of Ohio Application October 27, 1955, Serial No. 543,141

1 Claim. (Cl. 121—40)

This invention relates generally to lock mechanisms and more particularly to a fluid operated lock mechanism for use in combination with fluid operated pistons and cylinders.

It is an important object of this invention to provide a new and improved lock mechanism for use with fluid motors which provides a positive mechanical stop or lock to prevent movement of the fluid motor.

It is another important object of this invention to provide a new and improved lock mechanism suitable for use with fluid operated piston and cylinder actuators and the like.

It is still a further object of this invention to provide a lock mechanism adapted for use in retraction actuators for aircraft landing gears.

It is still another object of this invention to provide a lock mechanism in combination with a piston and cylinder actuator wherein the lock mechanism prevents fluid from being supplied to the actuator until the mechanism is completely unlocked.

Further objects and advantages will appear from the following description and drawings, wherein.

In retractable landing gears it is necessary to provide an actuator which supplies the power necessary for the retraction of the gear and normally a piston and cylinder type actuator is utilized for this purpose because of its simplicity. It is also necessary to provide a mechanical down lock to insure that the landing gear does not collapse during the impact of landing or when the aircraft is on the ground. A lock mechanism according to this invention is particularly suited for such use since it is capable of carrying the very large loads which occur during landing impacts as well as providing a structure which is light weight and dependable in operation.

Figure 1:
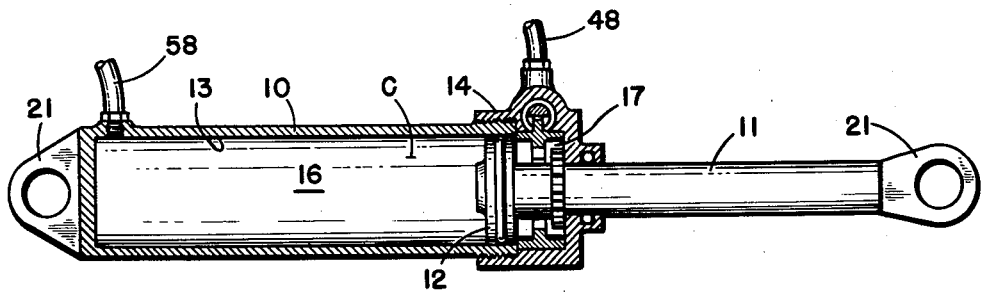
Figure 1 is a side elevation in longitudinal section of the preferred lock mechanism according to this invention installed in a fluid actuator of the piston and cylinder type.

Reference should now be made to the drawing wherein Figure 1 discloses a fluid motor including a cylinder 10 and a piston rod 11 axially movable relative thereto. A piston 12 is mounted on the inner end of the piston rod 11 and is adapted to move axially along the cylinder wall 13. An end member 14 is threaded onto one end of the cylinder 10 and in cooperation therewith defines a cavity "C" divided into a first chamber 16 and a second chamber 17 by the piston 12. The end member 14 provides a bearing and a fluid seal 18 through which the piston rod 11 can move axially and a fluid seal 19 is mounted on the piston 12 to prevent fluid communication between the two chambers 16 and 17. The cylinder 10 and piston rod 11 are both formed with mounting portions 21 so that the actuator may be connected to the associated equipment which should be arranged so that it prevents relative rotation between the piston rod 11 and the cylinder 10. If fluid under pressure is introduced into the chamber 16, a force is developed on the piston 12 and piston rod 11 which moves them to the right relative to the cylinder 10; and if fluid under pressure is introduced into the chamber 17, a force is developed which moves the piston 12 and piston rod 11 to the left relative to the cylinder 10.

Figure 2:
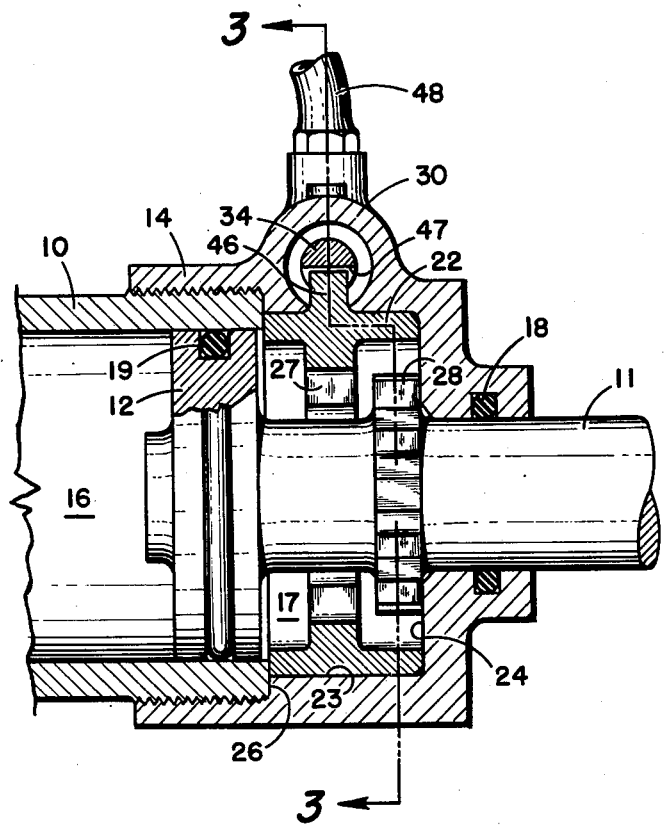
Figure 2 is an enlarged fragmentary longitudinal section showing the structural details of the lock mechanism.
Figure 3:
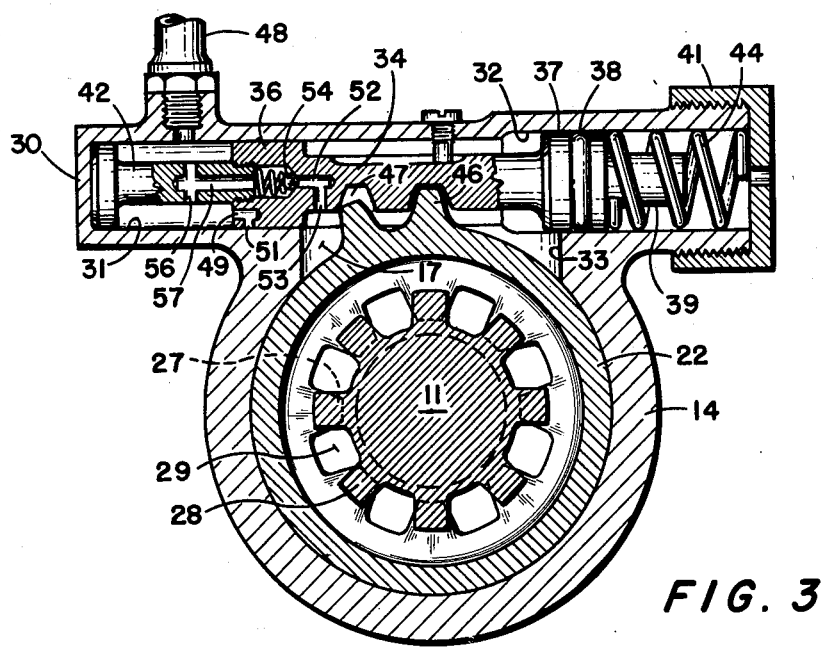
Figure 3 is a cross section taken along 3—3 of Figure 2 showing the lock mechanism in the locked position.
Figure 4:
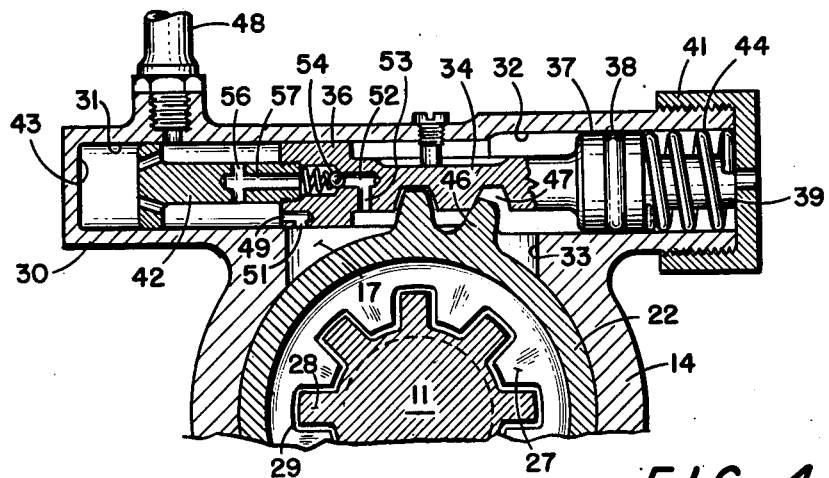
Figure 4 is a fragmentary cross section similar to Figure 3 showing the position of the elements when the lock mechanism is in the unlocked position.

A lock mechanism best shown in Figures 2 through 4 is provided within the end member 14. A rotatable lock ring 22 is radially positioned within a bore 23 and axially positioned between a radial wall 24 formed in the end member 14 and the end wall 26 of the cylinder 10. Therefore the lock ring 22 is rotatable and axially fixed relative to the cylinder 10. The lock ring is formed with an internal spline providing spaced inwardly projecting teeth 27 and the piston rod is formed with an external spline providing radially extending spaced teeth 28. The spaces 29 between the teeth 27 are larger than the teeth 28 so that when the two splines are oriented with the teeth 28 aligned with the spaces 29 the two splines can pass each other as shown in Figure 4. This is the unlocked position of the lock ring 22. If the two splines are oriented so that the teeth 28 are aligned with the teeth 27 axial motion of the piston rod 11 to the left from the position in Figures 1 and 2 is prevented. This of course is the locked position of the lock ring 22.

The teeth 28 are adapted to engage the radial wall 24 and limit the movement of the piston rod 11 to the right. The proportions of the splines should be arranged so that there is an axial clearance between the teeth of the splines when the piston rod 11 is in the extreme right end of its movement relative to the cylinder 10. This clearance has been exaggerated in the drawings for purposes of clarity, but in actual practice the clearance should be very small so that the piston rod will have very little free travel when the lock mechanism is in the locked position. However it is important that some clearance be provided so that there will be no friction due to engagement between the teeth of the two splines which would resist rotation of the lock ring.

An operating mechanism best shown in Figures 3 and 4 is utilized to rotate the lock ring 22 between the locked position shown in Figure 3 and the unlocked position of Figure 4. The end member 14 is provided with a boss 30 in which a first cross bore 31 extends past one side of the bore 23 and a second larger coaxial cross bore 32 are formed. The end member is also cut out as at 33 to provide communication between the second chamber 17 and the first cross bore 31. A plunger 34 is positioned within the two cross bores 31 and 32 and is provided with a piston portion 36 within the first cross bore 31 and a guide portion 37 within the second cross bore 32. A fluid seal 38 mounted on the guide portion 37 prevents fluid leakage out along the second cross bore 32 past the guide portion 37. The plunger is also formed with a stop projection 39 adapted to engage a cap member 41 threaded onto the end member 14 at the end of the second cross bore 32. A stop element 42 is threaded onto the inner end of the piston portion 36 and is adapted to engage the inner wall 43 of the first cross bore 31 and limit axial movement of the plunger 34 to the left as shown in Figure 3. A spring 44 extends between the cap member 41 and the guide portion 37 and resiliently urges the plunger 34 to the left toward the position wherein the stop elements 42 engage the inner wall 43 and normally holds it in this position.

To provide the connection between the plunger 34 and the lock ring 22 the lock ring is formed with projections 46 which extend radially from the lock ring into recesses 47 formed in the plunger 34 between the piston portion 36 and the guide portion 37. The various proportions are arranged so that the teeth 27 and 28 are aligned when the plunger 34 is in the left hand or normal position shown in Figure 3, and so that the lock ring 22 is rotated by axial motion of the plunger 34 until the teeth 28 are aligned with the spaces 29 when the plunger is in the right hand extreme position at which time the stop projection 39 engages the cap member 41. Thus axial motion of the plunger 34 between its two extreme positions operates to rotate the lock ring 22 between the locked position of Figure 3 to the unlocked position of Figure 4. Since the spring 44 normally holds the plunger in its left hand position, the lock ring is normally in the locked position; therefore, when fluid under pressure is not supplied to the actuator and the piston rod 11 is in its right hand position, the lock operates to prevent movement of the piston rod 11 relative to the cylinder 10.

In order to operate the actuator when fluid under pressure is supplied to the second chamber 17, it is necessary to first rotate the lock ring 22 to the unlocked position. We therefore provide a hydraulic connection through a pressure line 48 from a source of fluid under pressure, not shown, to the left hand side of the piston portion 36. The piston portion 36 is formed with a fluid passage 49 permanently open to the left hand side of the piston portion 36 and a cross passage 51 leading from the passage 49 to the circumference of the piston portion 36. The opening of the cross passage 51 is arranged so that it is within the first cross bore 31 when the plunger 34 is in the left hand position and does not establish communication with the second chamber 17 until the plunger 34 has moved to the right hand position. The plunger is also provided with passages 52 and 53 which are always in fluid communication with the second chamber 17 but are normally isolated from the left side of the piston portion 36 by a spring loaded ball check valve assembly 54. The stop element 42 is formed with fluid passages 56 and 57 which provide communication between the left side of the ball check valve assembly 54 and the left side of the piston portion 36.

If fluid under pressure is supplied to the left side of the piston portion 36 through the pressure line 48 when the plunger 34 is in the left hand position of Figure 3, the fluid cannot flow into the second chamber 17 because the check valve assembly 54 prevents flow in this direction through the passages 56, 57, 52 and 53. Also the passages 49 and 51 are not in communication with the second chamber 17 at this time. Therefore the pressure within the chamber 17 will not build up so long as the plunger 34 is in the left hand or locked position. As a result there could be no force developed on the piston 12 which would tend to urge the teeth 27 and 28 into engagement. However, fluid under pressure on the left hand face of the piston portion 36 produces a force thereon which overcomes the biasing force of the spring 44 and moves the plunger 34 to the right to the unlocked position of Figure 4.

Movement of the piston portion 36 to the right displaces volume within the second chamber 17 which is a function of the effective cross sectional area of the piston portion 36 and the stroke thereof. However, movement of the guide portion 37 to the right increases the volume of the second chamber 17 by an amount which is a function of the effective cross sectional area of the guide portion 37 times its stroke. Since the diameter of the cross bore 31 is smaller than the diameter of the cross bore 32, the guide portion 37 has a greater effective area than the piston portion 36. Therefore, movement of the plunger 34 to the right produces a resultant increase in the volume of the second chamber 17 so the plunger movement cannot cause a build up of pressure therein. Also if there is any leakage past the piston portion 36, the increase in volume of the second chamber 17 caused by the plunger movement will prevent a build up of pressure due to the leakage. This is important since a resilient seal cannot be used between the piston portion 36 and the first cross bore 31. Such a seal would fail because it would have to pass over the opening of the cross passage 31 or move out of engagement with the walls of the first cross bore. By utilizing a structure which will accommodate a small amount of leakage, it is possible to use the metal to metal seal between the piston portion 36 and the wall of the first cross bore 31.

As soon as the plunger 34 is moved to the right end or unlocked position, the pressure line 48 is in fluid communication with the second chamber 17 through the passages 49 and 51. Since the passages provide a restricted flow connection when compared to the capacity of the pressure line 48, a pressure drop will occur across the piston portion 31 until the pressure builds up within the second chamber 17. At this time the pressure within the second chamber 17 acts on the guide portion 37 to hold it in the right hand position against the force of the spring 44. Those skilled in the art will recognize that by utilizing this structure the lock ring 22 will rotate to the unlocked position before pressure can build up within the second chamber 17 which would cause engagement between the teeth 27 and 28. Therefore the lock ring 22 is free to rotate and there is no friction due to such engagement resisting rotation of the lock ring.

When the piston 12 is at its left hand position spaced from the end member 14 and fluid under pressure is supplied to the first chamber 16 through a pressure line 58, the pressure line 48 is connected to a reservoir return. Therefore as the piston 12 moves to the right under the influence of the pressure within the first chamber 16, the volume of the second chamber 17 is reduced causing the fluid contained therein to flow through the passages 53, 52 past the check valve assembly 54 and through the pressure line 48 through the passages 57 and 56. The check valve assembly 54 therefore prevents the build up of pressure on the left hand side of the piston portion 36.

Figure 5:
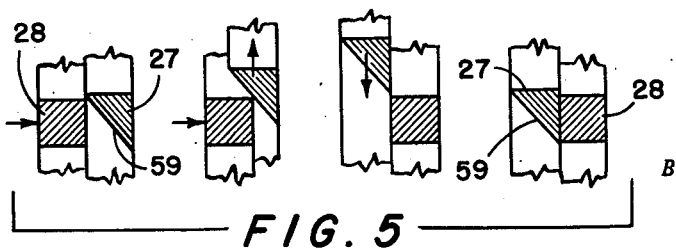
Figure 5 illustrates the progressive camming operation which permits the piston to move into the locked position.

In order to permit the teeth 28 to pass to the teeth 27 when the piston rod 11 is moving to the right to its extreme position, the teeth 27 are formed with a camming surface 59 which is engaged by the teeth 28. The cross section of the teeth and the operation of the camming is shown in a series of progressive illustrations of Figure 5. When the teeth 28 move to the right into engagement with the camming surface 59, the lock ring is rotated to the unlocked position against the force of the spring 44. After the teeth 28 have passed the teeth 27, the spring 44 returns the lock ring 22 to the locked position as shown by the final illustration in Figure 5.

Figure 6:
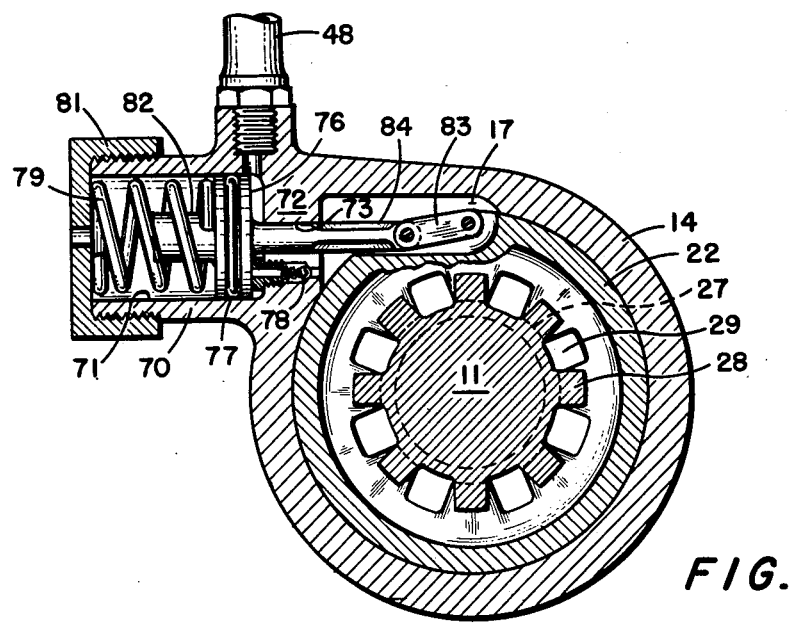
Figure 6 is a cross section of a second embodiment of the lock operator incorporating this invention wherein the elements are shown in the locked position; and, Figure 7 is a view similar to Figure 6 showing the position of the elements of the lock mechanism in the unlocked position.
Figure 7:
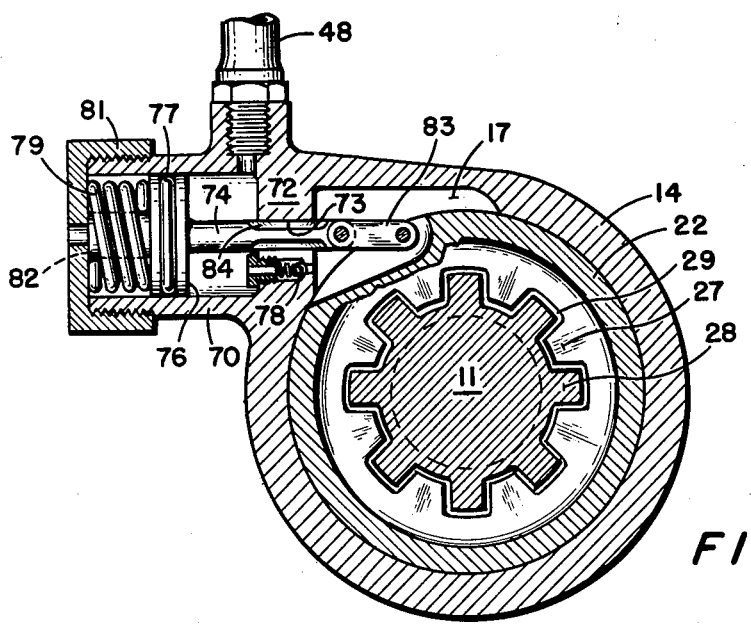

In Figures 6 and 7 a second embodiment of the lock actuator mechanism is shown. In these figures the reference numerals which are the same as those used in the embodiment of Figures 1 through 5 designate a structure which is identical to the structure of the first embodiment. The piston 11 is formed with radially extending teeth 28 which are adapted to engage the inwardly projecting teeth 27 formed on the lock ring 22 when the lock ring is in the locked position shown in Figure 6. When the lock ring 22 is rotated to the unlocked position shown in Figure 7, the spaces 29 on the lock ring are aligned with the teeth 28 so free movement of the piston 11 is permitted.

The end member 14 in this embodiment is formed with a boss 70 which is formed with a bore 71 terminating at a shoulder 72. The shoulder 72 defines a central bore or opening 73 coaxial with and having a diameter smaller than the diameter of the bore 71. A plunger 74 extends through the central opening 73 and is formed with a piston portion 76 provided with a seal 77 which seals against the surface of the bore 71. A back check valve assembly 78 is mounted in the shoulder 72 to permit flow of fluid from the second chamber 17 to the bore 71 while preventing flow in the opposite direction. The plunger 74 is slidable in the central opening 73 between a right hand extreme position shown in Figure 6 and a left hand extreme position shown in Figure 7. A spring 79 projects between the piston 76 and a cap member 81 threaded onto the boss 70 over the bore 71. This spring biases the piston 76 and plunger 74 to the right hand position in which position the piston 76 engages the check valve assembly 78 to limit movement in this direction. The plunger 74 is formed with a stop projection 82 which engages the cap member 81 when the plunger is in the left hand extreme position. A connecting link 83 is pivotally connected to both the lock ring 22 and the plunger 74 and the various elements are proportioned so that the lock ring 22 is in the locked position when the plunger 74 is in the right hand extreme position and the lock ring 22 is in the unlocked position when the plunger 74 is in the left hand extreme position.

The pressure line 48 is connected to the bore 71 between the piston 76 and the central opening 73 so when pressure fluid is introduced into the bore 71 through the pressure line 48 a reaction force is developed on the piston 76 which overcomes the biasing force of the spring 79 and moves the plunger 74 to the left hand position. This of course rotates the lock ring 22 to the unlocked position. The plunger 74 is provided with fluting 84 which extends through the shoulder 72 only when the plunger 74 is in the left hand position to provide fluid communication between the bore 71 and the second chamber 17 and a close fit is provided between the central passage 73 and the plunger 74 so the fluid cannot flow from the bore 71 to the second chamber 17 when the plunger is in any other position. Therefore, pressure fluid cannot flow into the second chamber 17 until the lock ring 22 is in the unlocked position. Here again movement of the plunger as the lock ring 22 is rotated to the unlocked position increases the volume of the second chamber 17 so that leakage which might take place along the plunger 74 will not build up the pressure fluid within the second chamber 17 so the teeth 27 and 28 will not be caused to engage by such leakage.

Those skilled in the art will recognize that by utilizing this simple structure it is possible to provide a very strong light weight lock mechanism which can resist substantial forces and even support the impact loads which occur during the landing of an aircraft. The lock mechanism is particularly desirable when used with associated equipment wherein an actuator is operated only when there is a tension load on the piston rod so that there will be an axial clearance between the teeth 27 and 28. Reference may be made to the copending application of William B. Westcott Jr., Serial Number 541,249, filed October 18, 1955, for an illustration of such a landing gear structure wherein the lock mechanism according to this invention is particularly suited. It should be understood, however, that this lock mechanism may be utilized in applications other than landing gear applications wherever large loads must be carried.

Although preferred embodiments of this invention are illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description are determinative of the scope of the invention.

We claim:

In combination first and second members cooperating to define an actuator chamber adapted to receive pressure fluid to produce relative movement between said members, lock means operable between a locked position wherein relative movement between said members is prevented and an unlocked position wherein said relative movement is permitted, said first member being formed with a plunger recess, a plunger movable in said recess formed with a piston portion and a guide portion spaced from said piston portion both of which engage and seal with the walls of said recess, said chamber and the zone of said recess between said piston portion and guide portion being a fluid communication, the effective area of said guide portion being greater than the effective area of said piston portion whereby movement of said plunger in one direction increases the volume of said chamber, connecting means between said plunger and lock means moving the latter to said unlocked position when said plunger means moves in said one direction to an operated position and moving said lock means to said locked position when said plunger moves in the opposite direction, a port adapted to supply fluid under pressure to the side of said piston portion remote from said guide portion to move said plunger in said one direction to said operated position, said plunger being formed with passage means providing fluid communication between said port and chamber only when said plunger is in said operated position.

References Cited in the file of this patent

UNITED STATES PATENTS

| 2,181,562 | Genahl | Nov. 28, 1939 |
| 2,249,850 | Palmer | July 22, 1941 |

FOREIGN PATENTS

| 608,704 | Great Britain | Sept. 20, 1948 |